US009722686B2

United States Patent
Park et al.

(10) Patent No.: US 9,722,686 B2
(45) Date of Patent: Aug. 1, 2017

(54) HIERARCHICAL DISTRIBUTED ANTENNA SYSTEM

(71) Applicant: LG ELECTRONICS INC., Seoul (KR)

(72) Inventors: Kyungmin Park, Seoul (KR); Jiwon Kang, Seoul (KR); Kitae Kim, Seoul (KR); Kilbom Lee, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/158,064

(22) Filed: May 18, 2016

(65) Prior Publication Data

US 2016/0345257 A1    Nov. 24, 2016

Related U.S. Application Data

(60) Provisional application No. 62/163,965, filed on May 19, 2015.

(51) Int. Cl.
| | | |
|---|---|---|
| *G06F 17/00* | (2006.01) | |
| *H04B 7/08* | (2006.01) | |
| *H01Q 21/28* | (2006.01) | |
| *H01Q 1/32* | (2006.01) | |
| *H04W 88/06* | (2009.01) | |

(52) U.S. Cl.
CPC .......... *H04B 7/0808* (2013.01); *H01Q 21/28* (2013.01); *H01Q 1/3275* (2013.01); *H04W 88/06* (2013.01)

(58) Field of Classification Search
CPC .... H04W 48/20; H04W 88/06; H01Q 1/3275; H01Q 21/00; H04B 7/0808
See application file for complete search history.

(56) References Cited

U.S. PATENT DOCUMENTS

| | | | | |
|---|---|---|---|---|
| 6,862,500 | B2 * | 3/2005 | Tzamaloukas | G01C 21/26 340/991 |
| 8,983,493 | B2 * | 3/2015 | Brachet | G01S 5/0236 340/572.4 |
| 2007/0224938 | A1 * | 9/2007 | Jung | H04B 5/0062 455/41.2 |
| 2011/0103435 | A1 * | 5/2011 | Whikehart | H04H 40/18 375/216 |
| 2016/0150451 | A1 * | 5/2016 | Barreto de Miranda Sargento et al. | H04W 36/14 370/332 |

* cited by examiner

*Primary Examiner* — Dac Ha
(74) *Attorney, Agent, or Firm* — Birch, Stewart, Kolasch & Birch, LLP

(57) ABSTRACT

The present document is for a wireless communication with reduced internal signaling burden in the distributed antenna system (DAS). In the proposed method, a user equipment (UE) receives signals, from the network, by multiple distributed unit (DUs) distributed within the UE, wherein the multiple DUs comprise one or more main DUs and one or more sub DUs; reports, by the sub DUs, first reception information of the signals to one of the main DUs; reports, by the one of the main DUs, second reception information of the signals to a central unit (CU) controlling the multiple DUs based on the first reception information of the signals; and determines, at the CU, which one or more DUs among the multiple DUs are to transfer the received signals to the CU based on the second reception information of the signals.

12 Claims, 12 Drawing Sheets

(a)

(b)

HIERARCHICAL DISTRIBUTED ANTENNA SYSTEM

CROSS REFERENCE

This application claims the benefit of the U.S. Provisional Patent Application No. 62/163,965, filed on May 19, 2015, which is hereby incorporated by reference as if fully set forth herein.

BACKGROUND OF THE INVENTION

Technical Field

The present document is for a wireless communication system. More particularly, the present document is for a wireless communication with reduced internal signaling burden in the distributed antenna system (DAS) by applying hierarchical structure.

While the present document mainly discuss this with the example of implementing in-vehicle DAS system, it is only exemplary, and the proposed scheme/structure can be used for simple configuration of MIMO system with DAS configuration.

Discussion of the Related Art

In the conventional mobile communication system for mainly serving personal mobile communication devices, there is an inverse proportional relationship between the speed of the UE and required data rate/QoS. So, the conventional communication system is configured to provide high data rate/QoS for low speed UE, and to provide reliable service without radio link failure for the high speed UE even the data rate/QoS is somewhat low.

In the next generation communication system, there is a need for high data rate/QoS for the high speed UE, since the scope of the required service increase. For example, the users in the vehicle or public transportation would like to enjoy multi-media service during the drive through highway. Also, users want to enjoy multi-media service more while the speed of the vehicle is high.

In order to fulfil these needs, there can be two approaches. One is improving the network infra itself for high quality service to high speed users, and the other is a new system/scheme for this without affecting the network infra.

As one of the solution for the second approach, a vehicular MIMO system is considered. In conventional vehicular MIMO system, large size antenna arrays are implemented to the vehicle for this end. However, implementing the large size antenna array in the outside of vehicle has drawback for vehicle design and for aerodynamics. So, the vehicle vendors are reluctant to implement this kind of large antenna array. Presently, vendors prefer to use shark antenna system in their vehicle.

FIG. 1 shows a structure of conventional shark antenna system for vehicular communication.

The conventional shark antenna system is a combinational antenna system. As shown in FIG. 1, the shark antenna system implemented various antennas within one physical structure. In FIG. 1, the shark antenna includes combined structure for 4 or more different band/services in one antenna. So, it has limit for providing high quality mobile communication service.

However, the reason why the vendors prefer this instead of large antenna system is to reduce the space for the antennas. Large sized antennas would not good for car design and reduce the original driving performance of the vehicle.

SUMMARY OF THE INVENTION

Technical Problem

In order to solve this problem, the inventors of the present invention proposed to use the in-vehicular distributed antenna system (hereinafter, in-vehicle DAS system).

FIG. 2 shows a concept of in-vehicle DAS system implemented into a car.

As shown in FIG. 2, in-vehicle DAS system uses relatively small multiple antenna units distributed within the vehicle. Multiple antenna units may be hidden at each corner of the car as shown in FIG. 2, for example. These multiple antenna units can be referred to as 'DUs (Distributed Units)'. A CU (central unit) of in-vehicle DAS system can control each of DUs of the vehicle.

Since DUs are separated within the vehicle, the physical channel characteristics would be different and independent. This can provide diversity gain, but it can increase signaling overhead in order to consider each of the physical channel characteristics.

Also, in order to implement in-vehicle DAS system, additional consideration is required comparing to the conventional MIMO system.

FIGS. 3 and 4 show an example of required additional consideration for cell selection when in-vehicle DAS system is implemented.

In the conventional mobile communication system, the cell selection is performed when the signal strength of the received signal decreases and there is another cell with higher signal strength. That is, the cell selection is performed only based on the signal strength of each cell. But, when in-vehicle DAS system is implemented, it would be better to consider also the diversity of the ray for each DU.

In FIG. 3, a big truck is moving along with the vehicle in communication. If the speed of two cars is similar, the rays from a network in certain direction might be blocked for significant amount of time. It might degrade the quality of service for users in the vehicle. So, it would be better to consider also the diversity of rays when performing cell selection.

As shown in FIG. 4, the first cell (c0) is the closest cell providing the strongest signal, but it provides only one directional ray. But, the second cell (c1) provides various rays even its signal strength is somewhat lower than the first cell (c0). In this case, the second cell (c1) can be a better choice since the diversity in ray distribution provides more stable service as explained with FIG. 3.

So, in-vehicle DAS system may require additional consideration and the complexity increases.

FIG. 5 shows an exemplary structure of in-vehicle DAS system.

As shown in FIG. 5, multiple DUs can be implemented at each corner of car as with integrated antenna in it. CU may be located at the center of the car and control the multiple DUs. In order to do it, there need connections between CU and multiple DUs, and it would be preferable to establish it as lossless cable or by using lossless wireless communication units. This internal communication units can be referred to as 'relaying DU' as shown in FIG. 5.

If each DU just forwards the received RF signals to CU with relaying DU, the cable (for example) has significant burden to convey the RF signals lossless. It would cost high to meet this requirement. Also, when the car has accident and the cable is broken, the cost of repair would be significant.

Technical Solution

To achieve these and other advantages, a method for a user equipment (UE) to receive signals from a network, the method comprising: receiving signals, from the network, by multiple distributed unit (DUs) distributed within the UE, wherein the multiple DUs comprise one or more main DUs and one or more sub DUs; reporting, by the sub DUs, first reception information of the signals to one of the main DUs; reporting, by the one of the main DUs, second reception information of the signals to a central unit (CU) controlling the multiple DUs based on the first reception information of the signals; and determining, at the CU, which one or more DUs among the multiple DUs are to transfer the received signals to the CU based on the second reception information of the signals, is provided.

Each of the multiple DUs may down-convert the received signals and transfer the down-converted received signals upon receiving a direction to transfer the received signals from the CU.

The first reception information of the signals may comprise reliability information of the signals received by each of the sub DUs.

The second reception information of the signals may further comprise reliability information of the signals received by the one of the main DUs.

One or more of the first and the second reception information of the signals may comprise a part of the signals received by a specific DU among the multiple DUs. Here, the method may further comprise: transferring a rest of the signals received by the specific DU to the CU, when the specific DU is determined to transfer the signals to the CU.

One or more of the first and the second reception information of the signals may comprise reliability information of the received signals and a part of the received signals.

The UE may be implemented on a motor vehicle, and the multiple DUs may be distributed within the motor vehicle.

In another aspect of the present invention, a user equipment (UE) comprising: multiple distributed units (DUs), each of which includes antenna component to receive signals from the network, wherein the multiple DUs comprise one or more main DUs and one or more sub DUs, wherein each of the sub DUs is configured to report first reception information of the signals to one of the main DUs, wherein each of the main DUs is configured to report second reception information of the signals to the CU based on the first reception information of the signals; and a central unit (CU) controlling the multiple DUs, and being configured to determine which one or more DUs among the multiple DUs are to transfer the received signals to the CU based on the second reception information of the signals, is provided.

Each of the multiple DUs may comprise: a down-converter down-converting the received signals; an analog-to-digital conversion (ADC) module; and a controller controlling a transfer of the received signals based on a direction from the CU.

Preferably, the sub DUs may be connected to the CU through one of the main DUs.

The first reception information of the signals may comprise reliability information of the signals received by each of the sub DUs. And, the second reception information of the signals may further comprise reliability information of the signals received by one of the main DUs.

One or more of the first and the second reception information of the signals may comprise a part of the signals received by a specific DU among the multiple DUs.

The UE may be implemented on a motor vehicle, and the multiple DUs may be distributed within the motor vehicle.

Advantageous Effects

By using the above scheme, the signaling overhead between CU and DU can be significantly reduced. So, it would make the cost of implementation lower than before.

Effects obtainable from the present invention may be non-limited by the above mentioned effect. And, other unmentioned effects can be clearly derived and understood from the following description by those having ordinary skill in the technical field to which the present invention pertains. Moreover, the present invention may have an unexpected advantage while those skilled in the art implement the present invention based on the following description.

BRIEF DESCRIPTION OF THE DRAWINGS

The accompanying drawings, which are included to provide a further understanding of the invention, provide embodiments of the present invention together with detailed explanation. A technical characteristic of the present invention may be non-limited by a specific drawing. A new embodiment can be configured by combining characteristics disclosed in each drawing with each other. Reference numerals in each drawing mean structural elements.

DETAILED DESCRIPTION OF THE INVENTION

Figure 1:
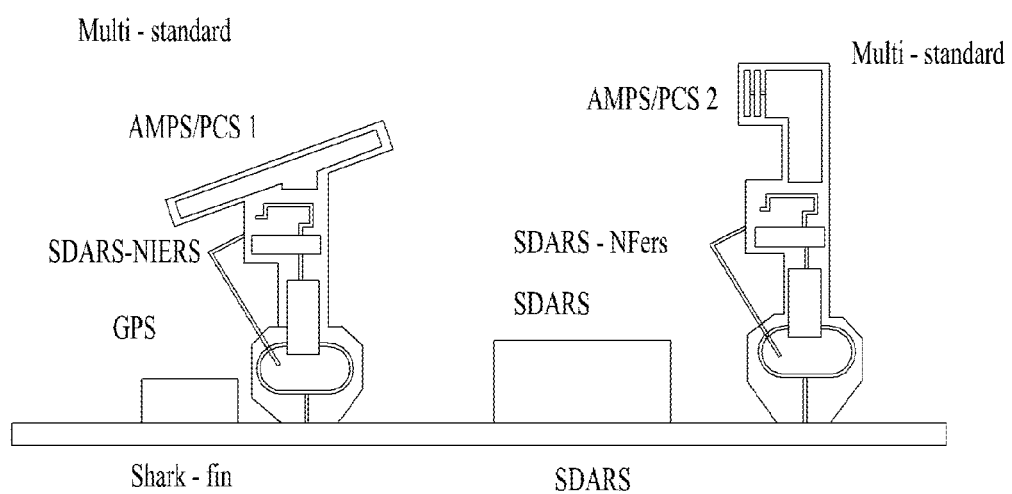
FIG. 1 shows a structure of conventional shark antenna system for vehicular communication.
Figure 2:
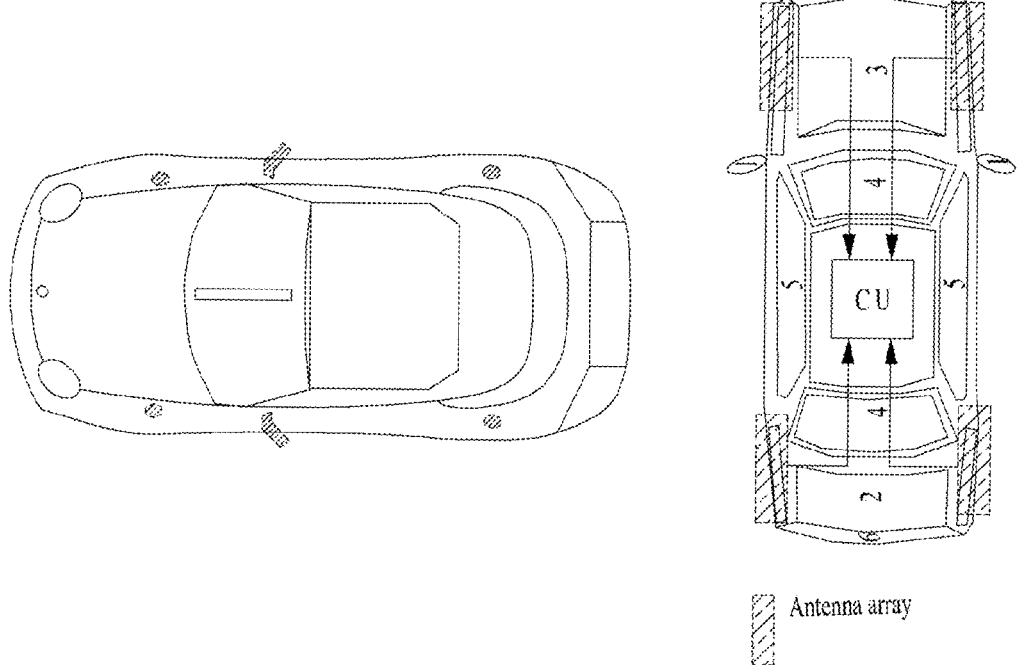
FIG. 2 shows a concept of in-vehicle DAS system implemented into a car.
Figure 3:
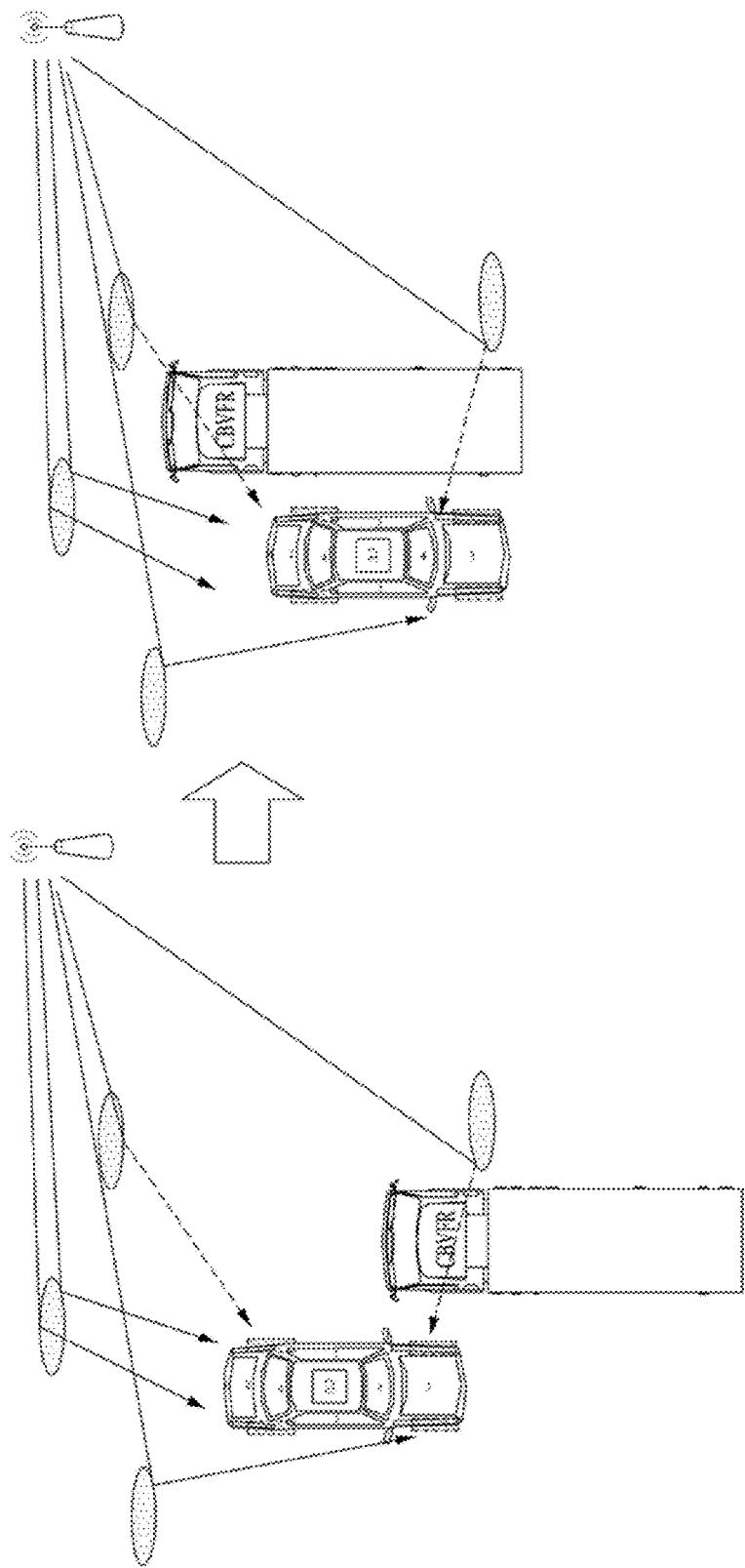
FIGS. 3 and 4 show an example of required additional consideration for cell selection when in-vehicle DAS system is implemented.
Figure 4:
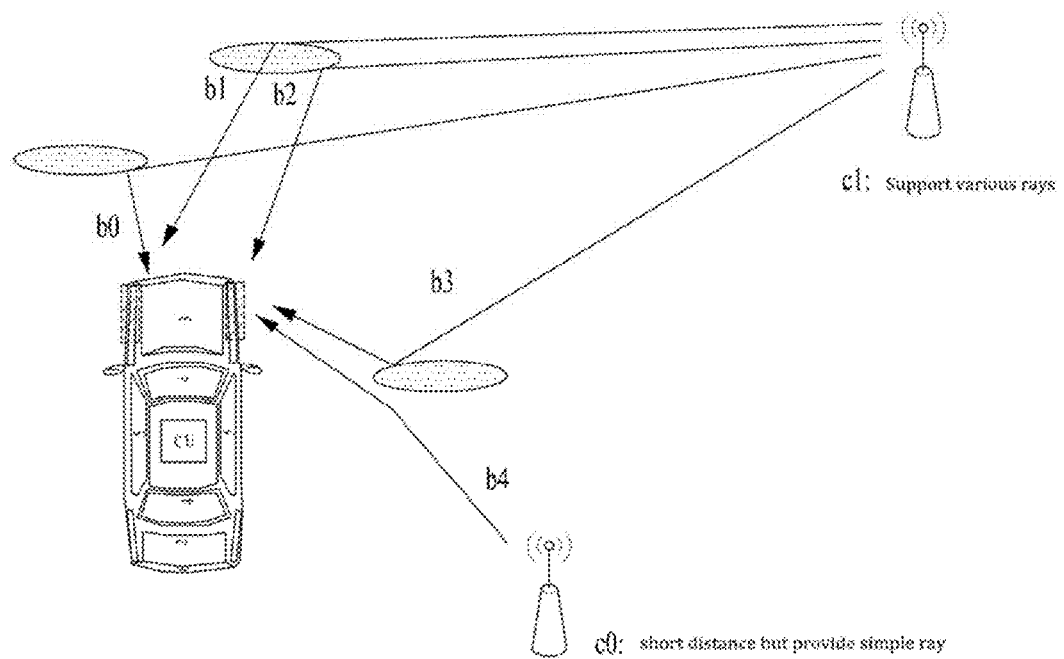
Figure 5:
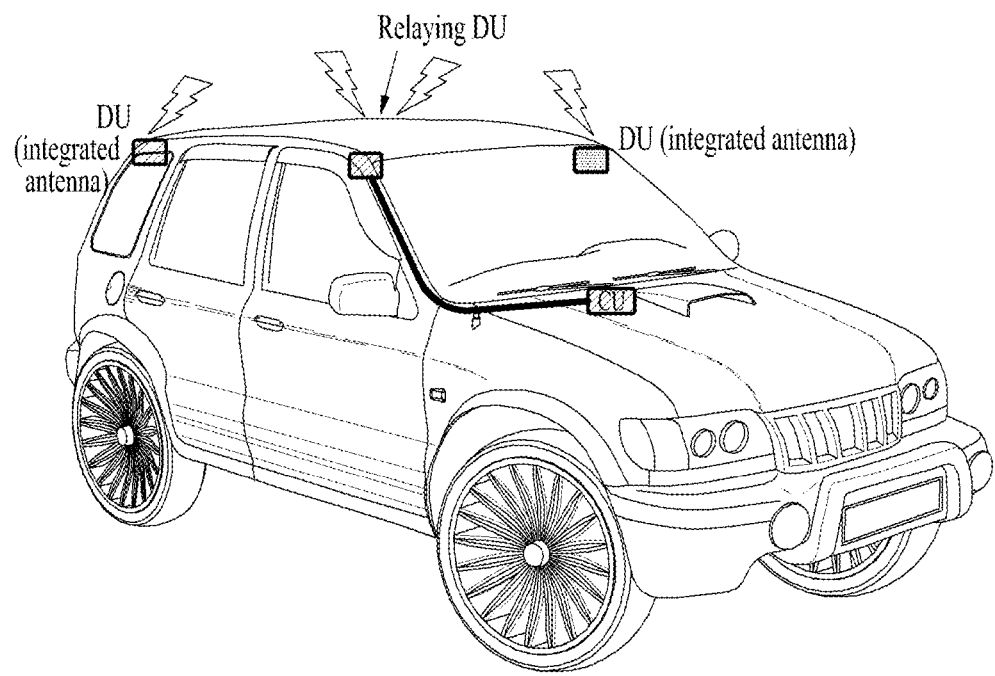
FIG. 5 shows an exemplary structure of in-vehicle DAS system.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

Procedures or steps probably making the point of the present invention unclear are skipped and procedures or steps understandable by those skilled in the art are also skipped as well.

In the present application, such a terminology as 'comprise', 'include' or the like should be construed not as excluding a different component but as further including the different component unless there is a special citation. And, in the present specification, such a terminology as ' . . . unit', ' . . . device', 'module' or the like means a unit for processing at least one function or an operation and can be implemented by a hardware, a software, or a combination thereof. Moreover, "a or an", "one", "the" or a similar related word can be used as a meaning including both a singular number and a plural number in the following contexts (in particular, in the following contexts of the claims) unless it is clearly contradicted to a context of the present invention.

In the present specification, the embodiments of the present invention are explained in a manner of mainly concerning data transmission and reception between a base station and a mobile station. In this case, the base station has a meaning of a terminal node of a network performing a direct communication with the mobile station. In the present disclosure, a specific operation, which is explained as performed by the base station, may be performed by an upper node of the base station in some cases.

In particular, in a network constructed with a plurality of network nodes including a base station, it is apparent that various operations performed for communication with a mobile station can be performed by the base station or other networks except the base station. 'Base station (BS)' may be substituted with such a terminology as a fixed station, a Node B, an eNode B (eNB), an advanced base station (ABS), an access point (AP) and the like.

And, a mobile station (MS) may be substituted with such a terminology as a user equipment (UE), a subscriber station (SS), a mobile station subscriber station (MSS), a mobile terminal (MT), an advanced mobile station (AMS), a terminal, and the like.

And, a transmitting end corresponds to a fixed and/or mobile node providing a data service or an audio service and a receiving end corresponds to a fixed and/or mobile node receiving the data service or the audio service. Hence, a mobile station becomes the transmitting end and a base station may become the receiving end in uplink. In the same manner, the mobile station becomes the receiving end and the base station may become the transmitting end in downlink.

And, when a device performs communication with a 'cell', it may indicate that the device transceives a signal with a base station of the cell. In particular, although the device actually transmits and receives a signal with a specific base station, for clarity, it may be represented as the device transmits and receives a signal with a cell formed by the specific base station. Similarly, a 'macro cell' and/or 'small cell' may indicate a specific coverage, respectively. Moreover, the 'macro cell' and/or the 'small cell' may indicate a 'macro base station supporting the macro cell' and a 'small cell base station supporting the small cell', respectively.

The embodiments of the present invention can be supported by standard documents disclosed in at least one of IEEE 802.xx system, 3GPP system, 3GPP LTE system and 3GPP2 system. In particular, unmentioned clear steps or parts of the embodiments of the present invention can be explained with reference to the aforementioned standard documents And, all terminologies disclosed in the present specification can be explained by the aforementioned standard document. In particular, embodiments of the present invention can be supported by at least one of a standard document of IEEE 802.16 including P802.16e-2004, P802.16e-2005, P802.16.1, P802.16p, and P802.16.1b.

In the following, preferred embodiment according to the present invention is explained in detail with reference to attached drawings. Detailed description disclosed together with the accompanying drawings is intended to explain not a unique embodiment of the present invention but an exemplary embodiment of the present invention.

Moreover, specific terminologies used in the embodiments of the present invention are provided to help understanding of the present invention and the use of the specific terminologies can be modified in a different form in a scope without departing from the technical idea of the present invention.

Figure 6:
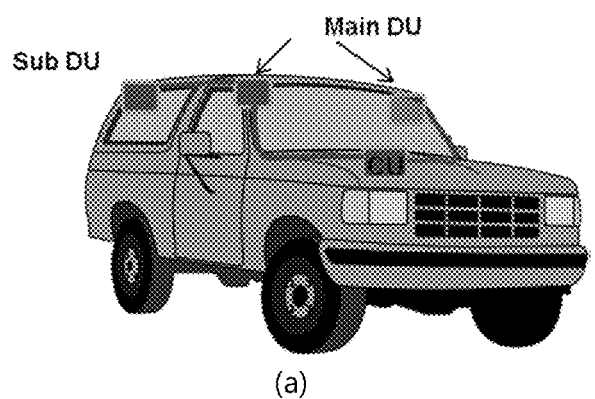
FIG. 6 shows exemplary hierarchical in-vehicle DAS structures according to one aspect of the present invention.
Figure 6:
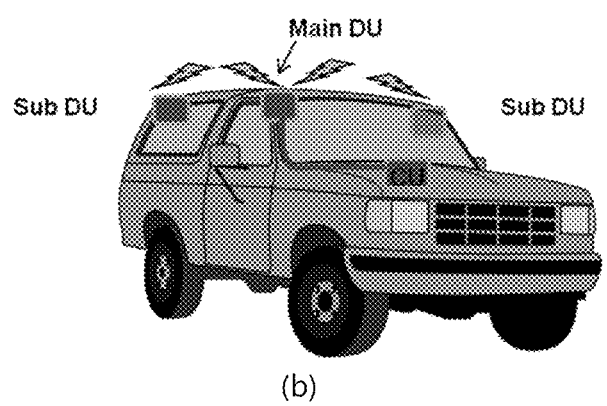

FIG. 6 shows exemplary hierarchical in-vehicle DAS structures according to one aspect of the present invention.

As shown in FIG. 6, the UE (implemented in a vehicle) may comprise multiple DUs distributed within the UE and a CU controlling these multiple DUs. Also, the UE may include one or more main DUs and one or more sub DUs. Rather than connecting all the DUs to the CU, sub DUs are connected to one of the main DUs. Based on this structure, sub DU(s) may transfer the received signals to the main DU(s) and the main DU(s) may control the transfer of the signals to the CU.

In FIG. 6(a), the multiple DUs are connected to the CU with wire connection. And, a sub DU is connected to the CU through a main DU. In FIG. 6(b), the multiple DUs are connected to the CU with wireless connection. And, a sub DU is connected to the CU through a main DU.

Figure 7:
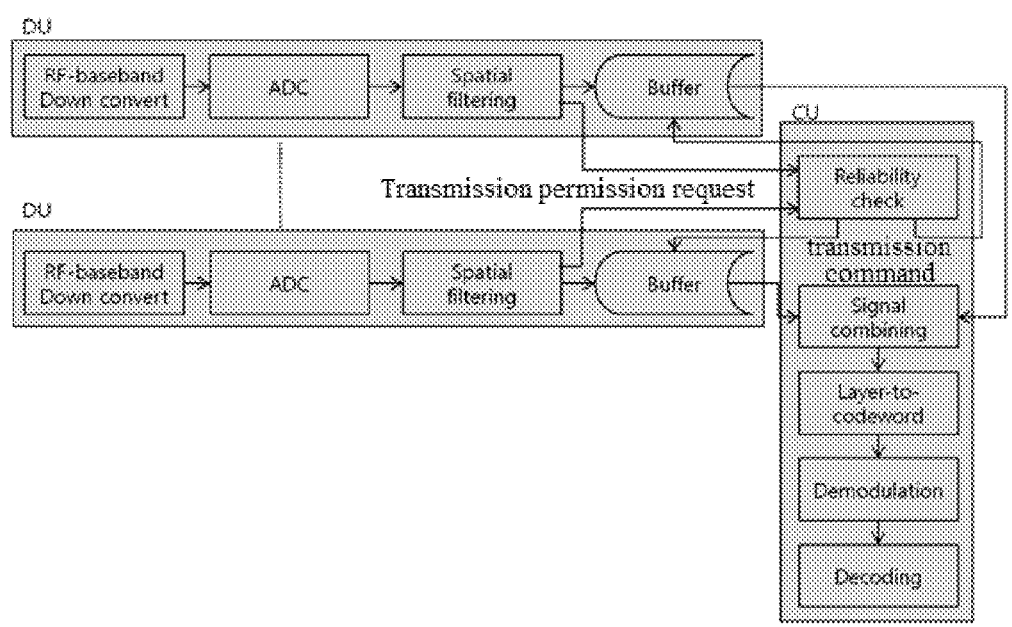
FIG. 7 shows exemplary structure of DUs according to one aspect of the present invention.

FIG. 7 shows exemplary structure of DUs according to one aspect of the present invention.

When a DAS receiver for receiving signals through a plurality of DUs and performing final restoration of information and execution of an application through a CU is designed, DU implementation costs and cable installation/maintenance costs between the DUs and the CU may be factors limiting the number of DUs. Accordingly, during design of the DAS receiver, it may be very important to efficiently construct the DUs in terms of cost.

An embodiment of the present invention proposes a DAS structure using DUs that performs the following operations, as a solution to the above two problems:

(1) performing carrier down conversion,
(2) performing spatial signal filtering according to multi-antenna reception (performing MIMO reception), when multiple antennas are installed in the DUs,
(3) performing analog-to-digital conversion (ADC), and
(4) transmitting all/some of the signals to the CU according to command of the CU.

FIG. 7 shows operation of the DAS receiver to which DUs capable of performing such functions are applied.

In FIG. 7, a signal processing procedure including a spatial filtering procedure is applied after a down-conversion procedure and an ADC procedure under the assumption of digital processing. However, the spatial filtering procedure may be performed in a radio frequency (RF) end. For example, the down-conversion procedure may be performed after the spatial filtering is performed through a phase shifter or a low noise amplifier (LNA) after an antenna receiver.

When the structure as illustrated in FIG. 7 is applied, the following advantages may be obtained in implementation of the structure.

(A) Installation costs of the DUs are reduced because a decoding block with high complexity is installed only in the CU rather than in the DUs.

(B) Burden of cable installation is remarkably reduced relative to the case in which an analog signal, especially, an RF band signal, should be transmitted between the DUs and the CU.

(C) Signal transmission is possible between the DUs and the CU through one cable per DU regardless of the number of reception antennas of a DU, when the DU performs signal combination during spatial filtering.

Hereinafter, various embodiments to reduce internal signaling overhead between DUs and CU are explained.

First Embodiment

The first embodiment proposes that each DU transmit information about reliability of each reception unit, such as a layer or a transport block, to a CU and the CU compare reliability of each reception unit to determine a reception unit that a DU is to transmit to the CU.

In the structure of FIG. 7, each of DUs first transmits a transmission permission request signal to a CU before transmitting a quantized digital value to the CU. This is to control cable traffic at a proper level or implement a DAS receiver using a capability limited cable by causing the CU to first determine reliability of each reception unit with respect to each DU and transmit, to the CU, only a signal received with high reliability which is worth transmitting to the CU through a cable.

Figure 8:
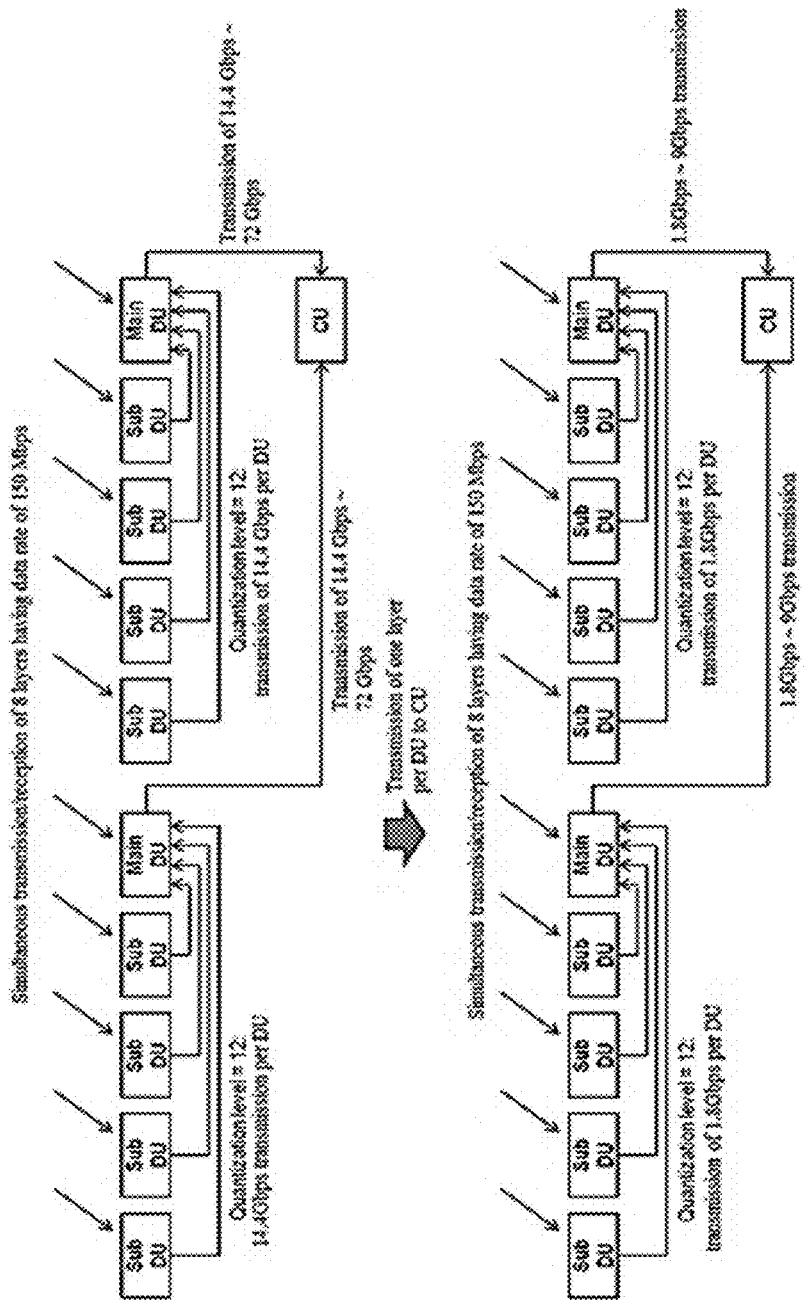
FIG. 8 shows an example for reducing internal signaling overhead between DUs and CU.

FIG. 8 shows an example for reducing internal signaling overhead between DUs and CU.

Specifically, FIG. 8 shows that transmission control described above is helpful to DAS implementation through a low capacity cable in a structure using non-uniform cable connection.

When a reception unit that each DU is to transmit, for example, a layer, is selected, a simple algorithm for transmitting a layer having highest reliability with respect to each DU may be performed. However, in this case, since a plurality of DUs reports a specific layer and no DUs transmit the other layers, overall reception reliability may be deteriorated.

As an extreme example, in FIG. 8, 10 DUs may transmit the same layer to a CU so that information about only one layer among 8 layers in total is transmitted to the CU. To avoid occurrence of such a problem, the CU should confirm reliability of each reception unit (for convenience, referred to as a layer hereinafter) for all DUs and determine a layer that each DU is to transmit so that information about all layers may be transmitted to the CU and reception reliability of each layer or transport block may be maintained at a proper level or more during signal combination. In this process, a DU may be commanded to transmit layers other than a layer having highest reception reliability to the CU among layers received thereby.

Figure 9:
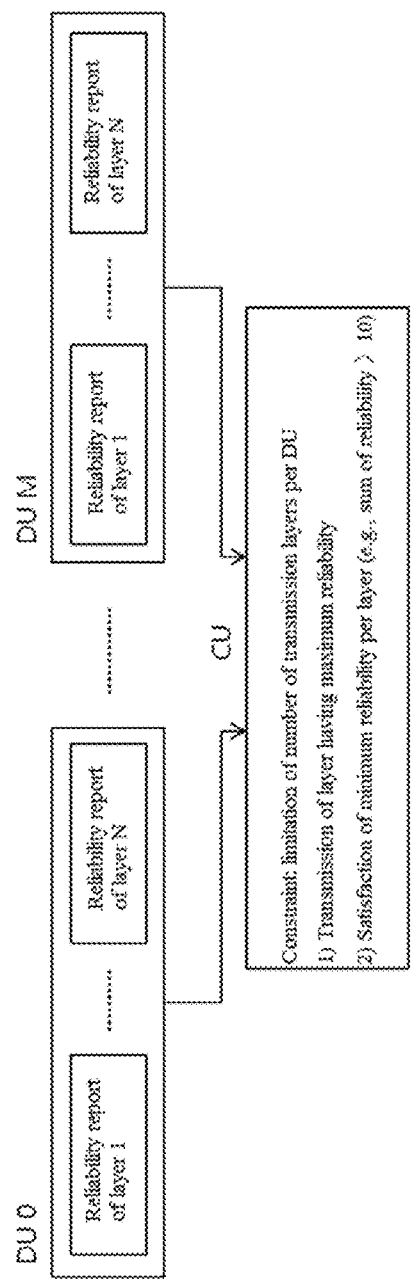
FIG. 9 shows an example for determining DU to transfer the received layer according to one embodiment of the present invention.

FIG. 9 shows an example for determining DU to transfer the received layer according to one embodiment of the present invention.

While FIG. 9 illustrates the case in which reception reliability of each reception layer of a DU is expressed as an index (a table in a lower part of FIG. 9 shows reliability of each reception layer of each DU), reliability information that each DU actually transmits to a CU may be a value that can be expressed as an index or an integer such as 1) a received signal-to-noise ratio (SNR), 2) a received signal-to-interference-plus-noise ratio (SINR), or 3) a gain/margin (dB) of a received SNR to a modulation and coding scheme (MCS) level required SNR or may be the form of a data stream consisting of a plurality of hard/soft values such as 4) a rough estimation for each symbol.

The reception reliability information may be reliability information considering multi-antenna reception gain of each DU. Accordingly, when respective DUs use different spatial filers (MIMO detectors), reliability may be calculated by different methods. For example, when a simple reliability calculation scheme for calculating an SNR or an SINR from a received reference signal is used, each DU may calculate reliability as indicated in Equation 1 with respect to a filtered signal obtained by applying a spatial filtering weight w to a received multi-antenna reference signal $\bar{r}$:

$$y = w\bar{r} \quad \text{[Equation 1]}$$

$$\text{SINR}(y) = \frac{E(|y_n|^2)}{\text{Var}(|y_n|)}$$

Equation 1 exemplarily shows the case in which the reference signal y is received over 'N' symbols or samples so that a received power average value and a magnitude variation of y can be measured.

In this case, when a specific DU implements a minimum mean-square-error (MMSE) spatial filtering, a spatial filter as indicated in the following equation may be used:

$$W=(H^*H+\sigma^2 I)^2 H^* \quad \text{[Equation 2]}$$

When another DU implements zero-forcing (ZF) spatial filtering, a spatial filter expressed as the following equation may be used:

$$W=(H^*H)^{-1}H^* \quad \text{[Equation 3]}$$

Consequently, the above two DUs calculate reception reliability using different schemes.

Second Embodiment

The second embodiment proposes a scheme in which each DU first transmits some information needed to restore data to a CU and the CU determines reception reliability of each DU based on the information and selects information (e.g., a codeword or a layer) that each DU is to transmit to the CU.

In the examples of FIG. 7 and FIG. 9, upon transmitting the transmission permission request signal to the CU, each DU transmits information capable of determining reliability of a signal received thereby in the transmission permission request signal. As the amount of information about a reception signal that the DU transmits to the CU or the amount of information about reliability of the reception signal increases, the CU may accurately determine reliability of each signal received by each DU but transmission of excessive information causes increase in cable traffic.

To avoid such a disadvantage, the present invention proposes a scheme of using some of signals that the DU should transmit to the CU for data restoration as signals for determining reliability and proposes the following operation as an example of the scheme.

(1) Some of quantized values that each UE should transmit to a CU are pre-transmitted to the CU. For example, 'N' most significant bits (MSGs) (digital value indicating the largest value) are pre-transmitted to the CU.

(2) The CU compares the quantized values reported by each DU and determines a DU that is to transmit each codeword/layer to the CU or determines a codeword/layer that each DU is to transmit to the CU.

(3) If the CU directs each DU to transmit a codeword/layer, the DU transmits bits except for pre-transmitted bits among quantized bits of the indicated layer to the CU.

Figure 10:
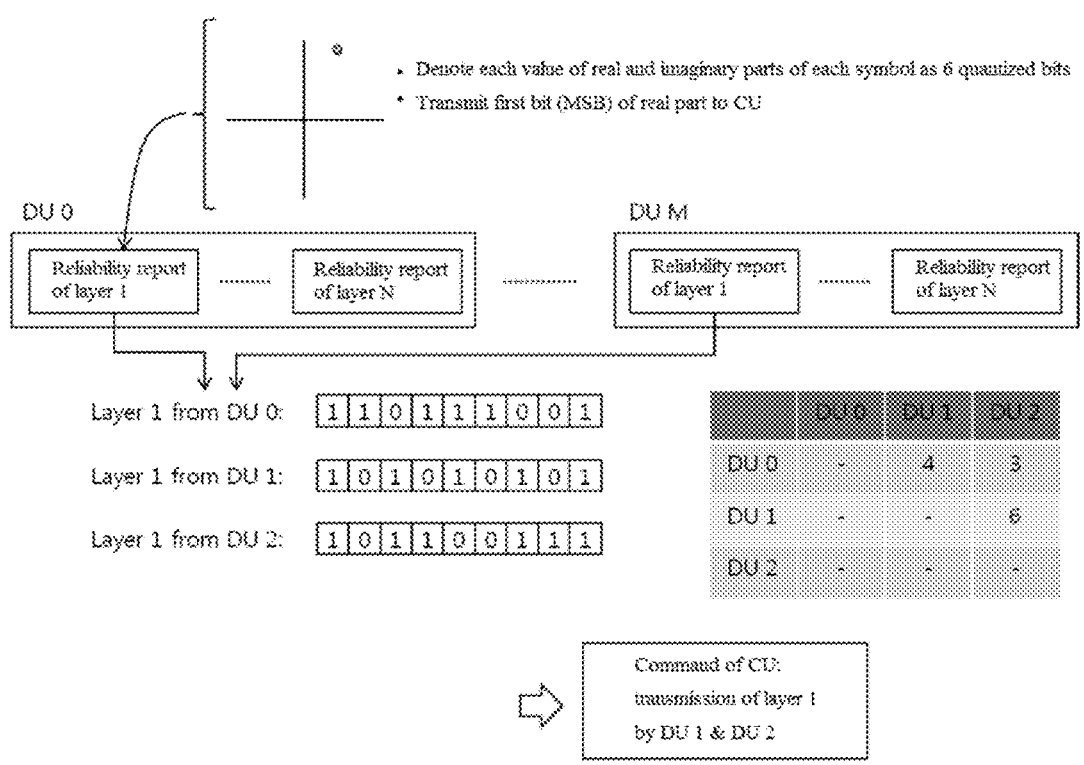
FIG. 10 shows another example for determining which of DUs/layers is to transfer the signals to the CU based on the MSBs of the received signals.

In performing the above operation, the scheme for determining 'which DU is to transmit which codeword/layer' of (2) is as illustrated in FIG. 10.

FIG. 10 shows another example for determining which of DUs/layers is to transfer the signals to the CU based on the MSBs of the received signals.

Under the assumption that reception reliability of each DU is a proper level, the CU compares information about "partial quantized bits" reported by each DU as illustrated in FIG. 10. Through the above comparison, the CU recognizes multiple DUs having high similarity as DUs having high reliability with respect to a corresponding layer and commands the DUs to transmit the codeword/layer. A table of a right lower part of FIG. 10 shows measurement values indicating how many times quantized bits of respective DUs are equal, as an example of comparing similarity of the quantized bits transmitted by the DUs.

Figure 11:
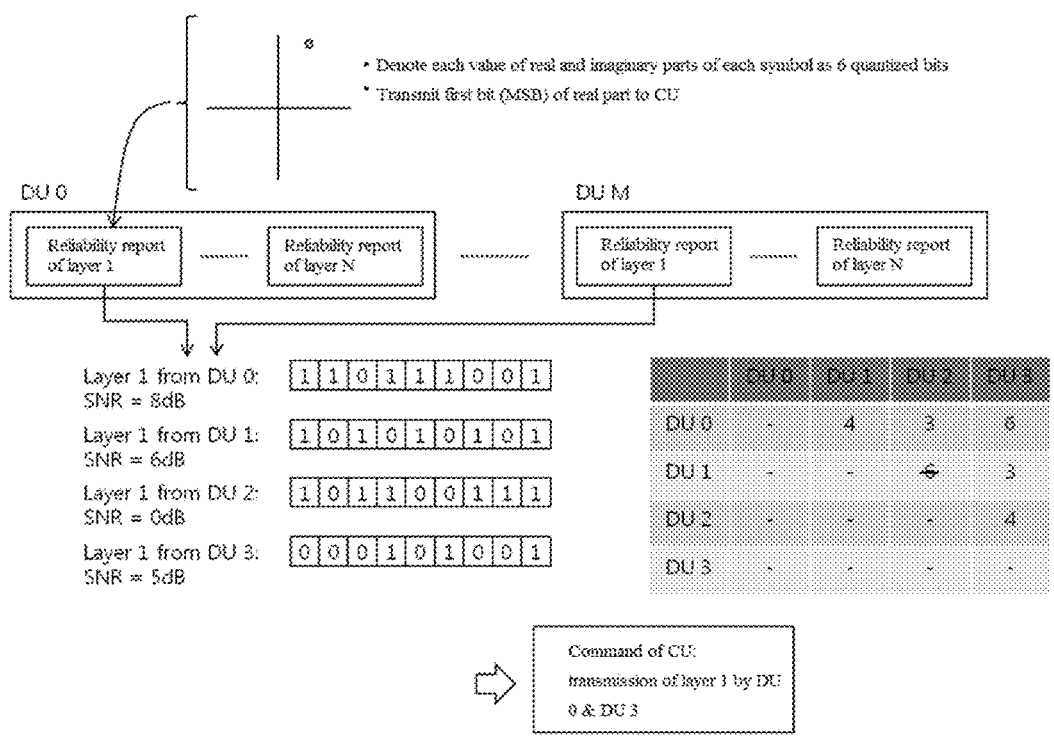
FIGS. 11 and 12 show another example for determining which of DUs/layers is to transfer the signals to the CU considering channel information.
Figure 12:
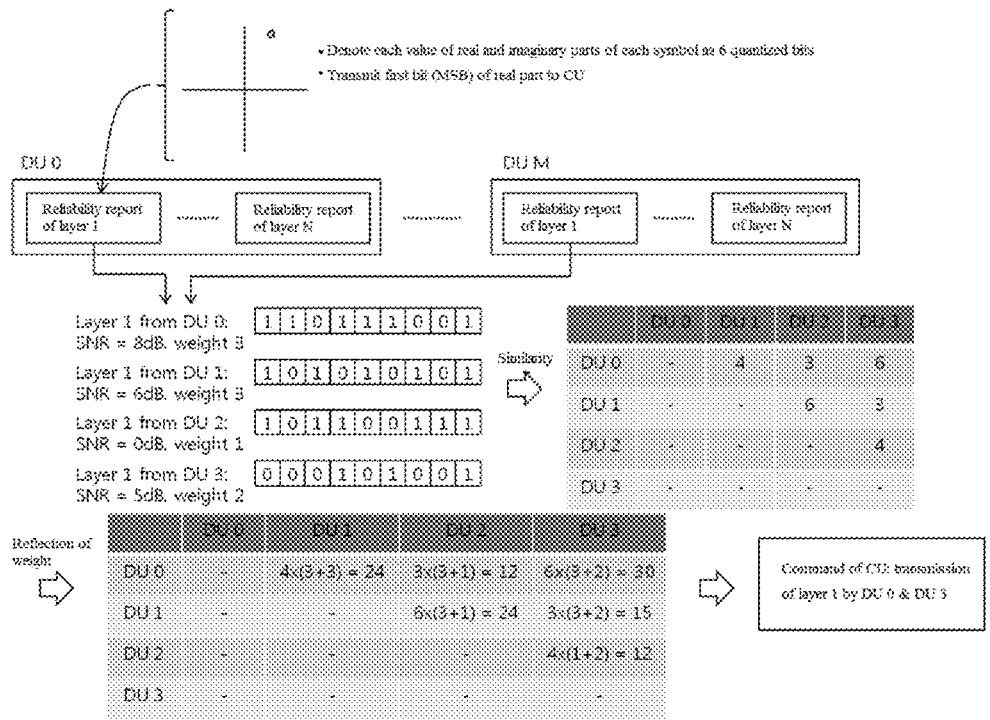

FIGS. 11 and 12 show another example for determining which of DUs/layers is to transfer the signals to the CU considering channel information.

As shown in FIGS. 11 and 12, each DU may further consider reliability information, such as SNR together with the part of the received signal in the above example.

When reliability levels of respective layers of each DU are obviously different from each other to a degree that can be recognized by each DU, for example, when received SNRs are greatly different, the DU reports this fact to the CU so that the CU may consider the same upon selecting a DU that is to transmit each layer. For example, if a received SNR of layer 1 of DU 2 is remarkably lower than a received SNR of layer 1 of DU 0 or DU 1 as in FIG. 11, the CU may determine a transmission DU of layer 1 by reflecting this case. In the example of FIG. 11, MSB similarity is highest between DU 1 and DU 2 and between DU 0 and DU 3, whereas a received SNR of DU 2 is very low and thus an MSB of DU 2 is lower in reliability than MSBs of the other DUs. In this case, DU 1 which has high MSB similarity with DU 2 may be determined as a DU having low reliability with respect to layer 1 like DU 2. Therefore, DU 0 and DU 3 are determined as transmission DUs of layer 1.

As another example, the "additional reliability information" may be applied to "reliability information" calculated through FIG. 10 as weight. For example, in the example of FIG. 12, if weight is determined as:
received SNRs of 0 to 3 dB: weight 1,
for received SNRs of 3 to 6 dB: weight 2, and
received SNR of 6 dB or more: weigh 3,
weighted reliability may be calculated as shown in FIG. 12 and DU 0 and DU 1 are selected based on the weighted reliability as DUs that are to transmit layer 1.

Device Configuration

Figure 13:
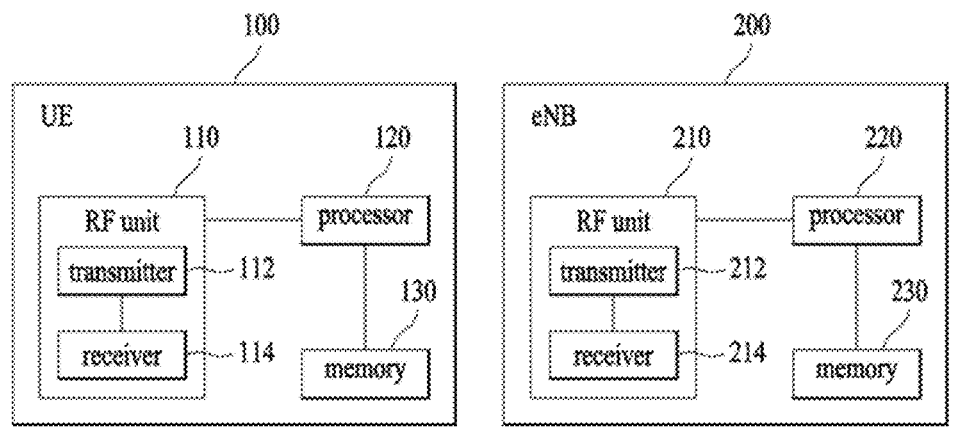
FIG. 13 is a block diagram for a user equipment and a eNB in accordance with the present invention.

FIG. 13 is a block diagram for a user equipment and a eNB in accordance with the present invention.

In FIG. 13, a user equipment 100 and a eNB 200 can include a radio frequency (RF) unit 110/210, a processor 120/220 and a memory 130/230, respectively. Although FIG. 13 shows one-to-one communication environment between the user equipment 100 and the eNB 200, communication environment can be constructed between a plurality of user equipment and the eNB 200. And, the eNB 200 depicted in FIG. 13 can be applied to both a macro cell eNB and a small cell eNB.

Each of the RF units 110/210 can include a transmission unit 111/211 and a reception unit 112/212, respectively. The transmission unit 111 and the reception unit 112 of the user equipment 100 are configured to transmit and receive a signal with the eNB 200 and different user equipments. They can be referred to as 'transceiver'. The processor 120 is functionally connected with the transmission unit 111 and the reception unit 112 and is configured to control the transmission unit 111 and the reception unit 112 to transmit and receive signal with different devices. And, the processor 120 performs various processing on a signal to be transmitted and transmits the signal to the transmission unit 111. The processor performs processing on a signal received by the reception unit 112.

If necessary, the processor 120 can store information included in an exchanged message in the memory 130. The user equipment 100 can perform the aforementioned various embodiments of the present invention with the above-mentioned structure.

The transmission unit 211 and the reception unit 212 of the eNB 200 are configured to transmit and receive a signal with different eNB and user equipments. The processor 220 is functionally connected with the transmission unit 211 and the reception unit 212 and is configured to control the transmission unit 211 and the reception unit 211 to transmit and receive signal with different devices. And, the processor 220 performs various processing on a signal to be transmitted and transmits the signal to the transmission unit 211. The processor performs processing on a signal received by the reception unit 212. If necessary, the processor 220 can store information included in an exchanged message in the memory 230. The eNB 200 can perform the aforementioned various embodiments of the present invention with the above-mentioned structure.

Each of the processors 120/220 of the user equipment 100 and the eNB 200 indicates (e.g., control, adjust, manage) operations in the user equipment 100 and the eNB 200. Each of the processors 120/220 can be connected with the memory 130/230 storing program codes and data. The memory 130/230 is connected with the processor 120/220 and stores an operating system, an application, and general files.

The processor 120/220 of the present invention can be named by such a terminology as a controller, a microcontroller, a microprocessor, a microcomputer and the like. Meanwhile, the processor can be implemented by hardware, firmware, software and a combination thereof. In the implementation by hardware, ASICs (application specific integrated circuits), DSPs (digital signal processors), DSPDs (digital signal processing devices), PLDs (programmable logic devices), FPGAs (field programmable gate arrays) and the like configured to perform the present invention can be installed in the processor 120/220.

Meanwhile, the aforementioned method can be written by a program executable in a computer and can be implemented by a general digital computer capable of operating the program using a computer readable medium. And, data structure used for the aforementioned method can be recorded in the computer readable medium in various means. Program storing devices usable for explaining a storing device including an executable computer code to perform various methods of the present invention should not be comprehended as temporary objects such as carrier waves and signals. The computer readable medium includes such a storing medium as a magnetic storing medium (e.g., a ROM, a floppy disk, a hard disk and the like) and an optical reading medium (e.g., a CD-ROM, a DVD and the like).

While the present invention has been described and illustrated herein with reference to the preferred embodiments thereof, it will be apparent to those skilled in the art that various modifications and variations can be made therein without departing from the spirit and scope of the invention. Thus, the disclosed methods should be considered in an explanatory viewpoint instead of a limitative viewpoint. The scope of the present invention is shown at not the detail description of the invention but the appended claims. Thus, it is intended that the present invention covers the modifications and variations of this invention that come within the scope of the appended claims and their equivalents.

INDUSTRIAL APPLICABILITY

While the present document mainly discuss this with the example of implementing in-vehicle DAS system, it is only exemplary, and the proposed scheme/structure can be used for simple configuration of MIMO system with distributed antennas.

What is claimed is:

1. A method for a user equipment (UE) to receive signals from a network, the method comprising:
   receiving signals, from the network, by multiple distributed unit (DUs) distributed within the UE,
   wherein the multiple DUs comprise one or more main DUs and one or more sub DUs;
   reporting, by the sub DUs, first reception information of the signals to one of the main DUs;
   reporting, by the one of the main DUs, second reception information of the signals to a central unit (CU) controlling the multiple DUs based on the first reception information of the signals,
   wherein one or both of the first reception information of the signals and the second reception information of the signals comprise a portion of the signals received by a specific DU among the multiple DUs;
   determining, at the CU, which one or more DUs among the multiple DUs are to transfer the received signals to the CU based on the second reception information of the signals; and
   transferring a remaining portion of the signals received by the specific DU to the CU, when the specific DU is determined to transfer the signals to the CU.

2. The method of claim 1, wherein each of the multiple DUs down-converts the received signals and transfers the down-converted received signals upon receiving a direction to transfer the received signals from the CU.

3. The method of claim 1, wherein the first reception information of the signals comprises reliability information of the signals received by each of the sub DUs.

4. The method of claim 3, wherein the second reception information of the signals further comprises reliability information of the signals received by the one of the main DUs.

5. The method of claim 1, wherein one or both of the first reception information of the signals and the second reception information of the signals comprise reliability information of the received signals and the portion of the received signals.

6. The method of claim 1, wherein the UE is implemented on a motor vehicle, and
   wherein the multiple DUs are distributed within the motor vehicle.

7. A user equipment (UE) comprising:
   multiple distributed units (DUs),
   wherein each of the multiple DUs includes an antenna component to receive signals from a network,
   wherein the multiple DUs comprise one or more main DUs and one or more sub DUs,
   wherein each of the sub DUs is configured to report first reception information of the signals to one of the main DUs; and
   a central unit (CU),
   wherein each of the main DUs is configured to report second reception information of the signals to the CU based on the first reception information of the signals,
   wherein the CU controls the multiple DUs, and determines which one or more DUs among the multiple DUs are to transfer the received signals to the CU based on the second reception information of the signals,
   wherein one or both of the first reception information of the signals and the second reception information of the signals comprise a portion of the signals received by a specific DU among the multiple DUs, and
   wherein a remaining portion of the signals received by the specific DU are transferred to the CU, when the specific DU is determined to transfer the signals to the CU.

8. The UE of claim 7, wherein each of the multiple DUs further comprises:
   a down-converter configured to down-convert the received signals;
   an analog-to-digital conversion (ADC) module; and
   a controller configured to control a transfer of the received signals based on a direction from the CU.

9. The UE of claim 7, wherein the sub DUs are connected to the CU through one of the main DUs.

10. The UE of claim 7, wherein the first reception information of the signals comprises reliability information of the signals received by each of the sub DUs.

11. The UE of claim 10, wherein the second reception information of the signals further comprises reliability information of the signals received by the one of the main DUs.

12. The UE of claim 7, wherein the UE is implemented on a motor vehicle, and
   wherein the multiple DUs are distributed within the motor vehicle.

* * * * *